Patented Feb. 14, 1950

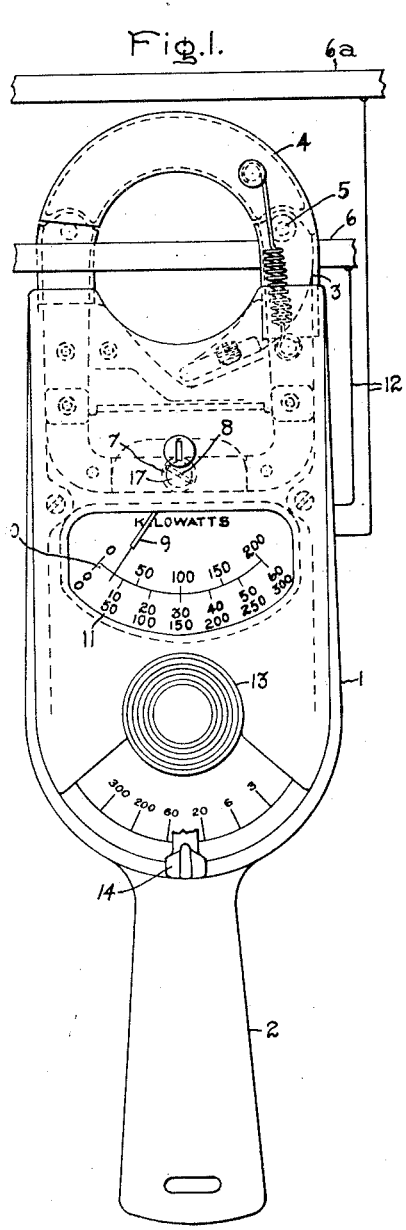
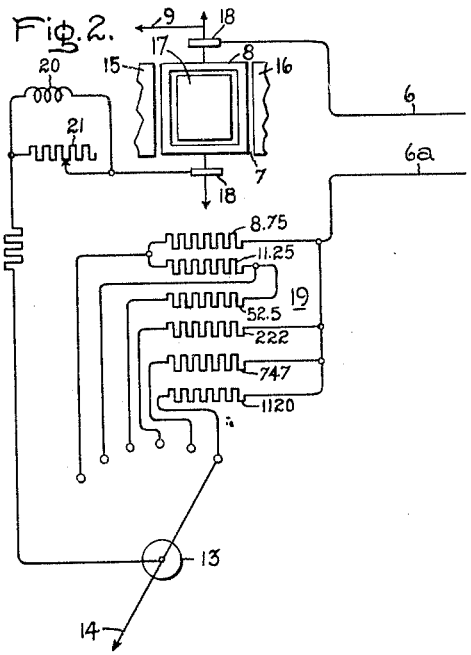
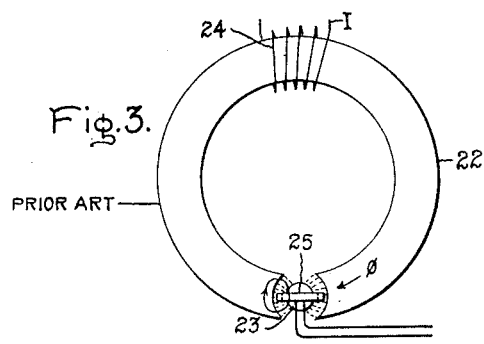
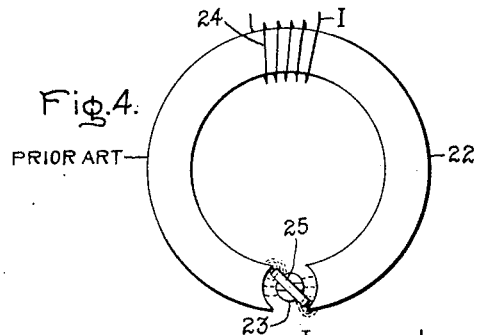
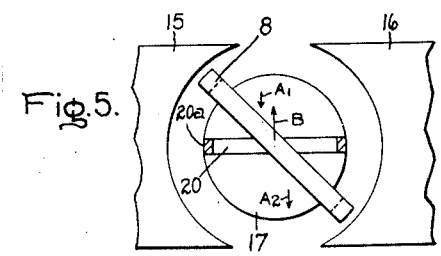
Inventor:
Shubel C. Haley,
by *Harvell & Mack*
His Attorney.

2,497,669

UNITED STATES PATENT OFFICE 2,497,669

FLUX DISTRIBUTION COMPENSATOR FOR ELECTRICAL MEASURING INSTRUMENTS

Shubel C. Haley, Narragansett, R. I., assignor to General Electric Company, a corporation of New York Application April 12, 1949, Serial No. 86,998

3 Claims. (Cl. 171—95)

My invention relates to flux distribution compensating means for electrical instruments such as measuring or relay instruments, where a coil moves in an air gap of a stationary field under conditions where compensation for the distortion of the air gap fluxes is beneficial. For this purpose, I employ a stationary compensating coil in series relation with the moving coil and coaxial therewith in about a midscale position of the moving coil. An example of an instrument where my invention is beneficial is the improvement in scale distribution of a long range hook-on wattmeter where there are large variations in both the fluxes produced by the stationary field and by the moving coil, and the invention will be described as applied to such an instrument.

The features of my invention which are believed to be novel and patentable will be pointed out in the claims appended hereto. For a better understanding of my invention, reference is made in the following description to the accompanying drawing in which Fig. 1 represents a long range hook-on wattmeter and its line connections. Fig. 2 is a wiring diagram of the range changing potential circuit for such a wattmeter. Fig. 3 shows the air gap arrangement of a wattmeter and, in general, a representation of the air gap fields produced by the stationary and moving coils, assuming no distortion. Fig. 4 is similar to Fig. 3 but representing in general the air gap flux distortion that can occur at high deflection angles of the moving coil without compensation; and Fig. 5 represents the air gap arrangement and in general the flux distribution when my compensator is employed.

Referring now to Fig. 1, I represents the casing structure of a hook-on wattmeter having a handle 2. The casing supports a magnetic circuit having an exposed upper end 3 provided with a hook part 4 hinged at 5 whereby it may be opened and closed over an electric conductor 6 such that a flux will be produced in the magnetic circuit proportional to the current flowing in such conductor. Within the casing structure the magnetic circuit is provided with an armature air gap as indicated in dotted lines at 7, and in such gap there is pivoted a coil 8 secured to a pointer 9, the latter indicating on a scale 10 seen through a window 11. The moving coil 9 is energized in response to the voltage of the circuit to be metered, this being indicated by the voltage connections 12 across conductors 6 and 6a. Multiplier resistances are provided in the voltage circuit within the casing 1 to enable the range to be changed by means of a knob 13, and the range selected indicated by a pointer 14. A suitable range changing voltage circuit here referred to is shown more in detail in Fig. 2.

Referring to Fig. 2, the moving coil of the wattmeter is shown at 8 in the armature air gap 7 formed by the inner circular core 17 and the pole pieces 15 and 16 of the magnetic circuit 3, generally described in connection with Fig. 1. Coil 8 is connected through lead-in spirals 18 across the line conductors 6 and 6a through any one of several range changing resistances at 19 selected by the position of knob 13.

The circuit also includes the compensating coil 20 and its adjustable shunt resistor 21 in series relation in the voltage circuit. It is to be understood that Fig. 2 represents the connection but not the location of compensating coil 20. Suitable relative values for the several range changing resistances at 19 may be as follows, listed from top to bottom: 8.75, 11.25, 52.5, 222, 747, and 1120 ohms respectively, thus providing for six different ranges of measurement by changing the value of resistance in the voltage circuit. Assuming a one-turn primary current coil corresponding to conductor 6, Fig. 1, for producing the current flux across the air gap 7 and a primary current variation range of from 20 to 600 amperes, the combination is suitable for measuring watts over a range from 3 to 300 kilowatts, when using a 1500-turn moving coil 8 and a 100-turn compensating coil 20. The magnetic circuit of the instrument should be of a high permeability material, such as a nickel iron alloy, to obtain good proportionality between primary current and current air gap flux over a wide range of current variation.

In a wide range instrument such as here contemplated, it is necessary to compensate for air gap flux distribution to attain uniformity of response over the wide ranges of current in the moving coil and primary current flux. This compensation will now be explained in connection with Figs. 3, 4, and 5; Figs. 3 and 4 representing prior art and being useful in explaining the need for the compensation shown in Fig. 5.

In Figs. 3 and 4, a simple laminated iron magnet 22 is indicated having a cylindrical laminated core 23 between curved pole faces, which gives a two-section annular air gap in which the main field flux produced by a winding 24 has radial distribution as represented in Fig. 3 by radial lines. A moving coil 25 is pivoted and turns in the air gap over a measurement range of less than 180 degrees and is adapted to be energized by a voltage current, and produces a flux generally as represented by the closed arrowed loop in Fig. 3. In this usual type of uncompensated instrument when the instrument is energized by currents in its coils, a torque is exerted on the moving coil which is roughly proportional to the product of these currents and (in the case of an alternating current instrument) the cosine of the angle of phase displacement. This proportionality holds reasonably well for small deflections and relatively low values of moving coil ampere turns. With larger deflections of the moving coil from the center line of the poles, the moving coil sides approach the field pole tips, and the distribution of the flux generated by the moving coil is not symmetrical in the air gap. As the moving coil approaches the pole tips, there is a concentration of flux in the gap near the pole tips adjacent the moving coil and a comparatively low flux density in the gap over the remaining portions of the pole faces as roughly represented in Fig. 4. This lack of symmetry about the sides of the moving coil introduces a torque component tending to move such coil to a position along the pole face center line or downscale. In a wide range instrument and particularly during conditions where there is a low level of main radial field flux and high ampere turns in the moving coil, this lack of symmetrical flux distribution at large deflections without compensation becomes excessive and the ideal linear relationship between torque and deflection no longer exists and, in extreme cases, pole tip saturation may be experienced and the linear relation between torque and current intensity is upset to different degrees for different coil deflections from the center line. Aside from other detrimental results when such a condition exists in a multiple range instrument, it is no longer possible to have common scale distribution characteristics and markings for two different ranges where the nonsymmetrical flux distribution occurs in different degrees.

My invention eliminates such nonsymmetry in moving coil flux distribution by the provision of a stationary compensating coil 20 located in an open slot 20a about the core 17 with its plane along the center line between the main pole pieces 15—16 and connected in series relation with the moving coil in such a direction as to produce a cross-magnetization opposing the flux of the moving coil and which annuls the distortion component of the moving coil flux in the air gap. This compensating coil is represented in Fig. 5. If in Fig. 5 the arrows $A_1$ and $A_2$ represent the distortion component of flux of the moving coil 8, then B represents the nullifying flux component of compensating coil 20. This compensation is proportional to the moving coil flux and can be adjusted, as by the shunt resistor 21, Fig. 2, to the desired relative value. Refinements in the compensation can be had by the shape of the slot and the positioning of the compensating coil in its slot in the magnetic core 17. It is to be noted that the range of the wattmeter may be changed by the range changing switch and resistances at 13 and 19 without changing the proportionality between the ampere turns in the moving coil 8 and compensating coil 20 because these coils are connected in series relation, and hence, after the compensation has been adjusted to the correct value by the resistance 21 in shunt to the compensating coil, it is correct for all ranges. In Fig. 1, the different kilowatt measuring ranges are marked for different positions of the pointer 14. Fig. 2 shows the pointer 14 in the 300 kw. range position.

What I claim as new and desire to secure by Letters Patent of the United States is:

1. An electrical measuring instrument comprising a stationary field magnet having pole pieces spaced apart by a gap, a stationary magnetic core centered in said gap and spaced from said pole pieces, a coil surrounding said core and rotatively mounted to rotate about the core and between it and said pole pieces, said coil having a measurement range of rotation of less than 180 degrees, a winding on said magnetic circuit for producing a field flux between its pole pieces and through the core, a stationary compensating coil mounted on said core within the moving coil for producing a flux through the core at substantially right angles to the direction of the field flux therethrough, and connections for connecting said two coils to a common source of supply such that the fluxes produced by said coils in the core will be proportional to each other and in opposition when the rotatively mounted coil is at approximately the center of its measurement range of rotation.

2. An electrical measuring instrument comprising a field magnet having pole pieces separated by an armature air gap, a magnetic core centered in such gap and spaced from the pole pieces, a moving coil surrounding said core and pivoted for rotation about said core and between it and said pole pieces, said coil having a measurement range of rotation of less than 180 degrees, a winding on said field magnet for producing a field flux through said core, a stationary compensating coil mounted on said core for producing a compensating flux in the core at approximately right angles to the field flux therethrough, said compensating coil having a relatively small number of turns as compared to the moving coil and connections for connecting said moving and compensating coils in series relation to a measurement source of supply such that the fluxes produced by said coils in the core will be in opposition when the moving coil is in approximately its mid-measurement range position, and an adjustable resistance in shunt to said compensating coil for adjusting the value of the compensating coil current relative to the moving coil current.

3. A wattmeter comprising a stationary field magnet having pole pieces separated by an armature air gap, a current winding for energizing said field magnet and producing a current flux between its pole pieces, a stationary core centered in the gap between the pole pieces and spaced from the pole pieces, a voltage coil mounted for rotation about said core and between it and said pole pieces, said coil having a measurement range of rotation of less than 180 degrees, a stationary compensating coil mounted on said core having relatively few turns as compared to the voltage coil, connections for connecting said voltage and compensating coils in series relation, the compensating coil being positioned on the core and connected to produce a compensating flux in the core which is in opposition to the flux produced by the voltage coil therein when the voltage coil is in approximately its mid-measurement range position, and variable resistance means connected in series relation with said voltage and compensating coils for changing the measurement range of said wattmeter while maintaining a proportionate relation between the voltage and compensating coil currents.

SHUBEL C. HALEY.

No references cited.